United States Patent
Ballantine et al.

(10) Patent No.: US 8,129,057 B2
(45) Date of Patent: Mar. 6, 2012

(54) HIGH EFFICIENCY FUEL CELL SYSTEM

(75) Inventors: Arne W. Ballantine, Round Lake, NY (US); Michael D. Gasda, Albany, NY (US); James F. McElroy, Suffield, CT (US)

(73) Assignee: Honda Motor Co., Ltd. (JP)

( * ) Notice: Subject to any disclaimer, the term of this patent is extended or adjusted under 35 U.S.C. 154(b) by 1540 days.

(21) Appl. No.: 11/295,379

(22) Filed: Dec. 6, 2005

(65) Prior Publication Data

US 2007/0128478 A1 Jun. 7, 2007

(51) Int. Cl.
*H01M 8/18* (2006.01)
*H01M 8/06* (2006.01)

(52) U.S. Cl. .................... 429/418; 429/415; 429/417

(58) Field of Classification Search .............. None
See application file for complete search history.

(56) References Cited

U.S. PATENT DOCUMENTS

| | | | | |
|---|---|---|---|---|
| 3,668,013 | A | 6/1972 | Franz | 429/25 |
| 4,543,303 | A * | 9/1985 | Dantowitz et al. | 429/34 |
| 5,688,611 | A | 11/1997 | Golben | 429/53 |
| 6,124,060 | A | 9/2000 | Akita et al. | 429/307 |
| 6,168,705 | B1 | 1/2001 | Molter et al. | 205/637 |
| 6,280,865 | B1 | 8/2001 | Eisman et al. | 429/17 |
| 6,383,670 | B1 | 5/2002 | Edlund et al. | 429/20 |
| 6,569,298 | B2 | 5/2003 | Merida-Donis | 204/263 |
| 6,686,078 | B1 | 2/2004 | Jones | 429/17 |
| 6,696,190 | B2 | 2/2004 | Haridoss | 429/22 |
| 6,821,664 | B2 | 11/2004 | Parks et al. | 429/25 |
| 6,833,206 | B2 | 12/2004 | Erdle et al. | 429/17 |
| 2002/0051898 | A1 * | 5/2002 | Moulthrop et al. | 429/17 |
| 2002/0068206 | A1 | 6/2002 | Suzuki et al. | 429/20 |
| 2002/0114984 | A1 | 8/2002 | Edlund et al. | 419/19 |
| 2004/0191597 | A1 * | 9/2004 | McElroy | 429/26 |
| 2005/0142407 | A1 * | 6/2005 | Fuller et al. | 429/23 |
| 2005/0164069 | A1 * | 7/2005 | Margiott et al. | 429/38 |
| 2007/0148505 | A1 | 6/2007 | Gutenmann | |

OTHER PUBLICATIONS

U.S. Appl. No. 10/214,019, entitled "Method and Apparatus for Electrochemical Compression and Expansion of Hydrogen in a Fuel Cell System," filed Aug. 7, 2002.
U.S. Appl. No. 10/214,022, entitled "Method and Apparatus for Electrochemical Compression and Expansion of Hydrogen in a Fuel Cell System," filed Aug. 7, 2002.
U.S. Appl. No. 10/213,798, entitled "Method and Apparatus for Electrochemical Compression and Expansion of Hydrogen in a Fuel Cell System," filed Aug. 7, 2002.
U.S. Patent Application entitled "High Efficiency Fuel Cell System," filed concurrently herewith (Dec. 6, 2005).

* cited by examiner

*Primary Examiner* — Barbara Gilliam
*Assistant Examiner* — Adam A Arciero
(74) *Attorney, Agent, or Firm* — Nelson Mullins Riley & Scarborough LLP; Anthony A. Laurentano

(57) ABSTRACT

A technique includes operating a fuel cell, which produces an effluent flow. The technique includes routing the effluent flow through an electrochemical pump to extract fuel from the effluent flow and providing the extracted fuel to the fuel cell.

10 Claims, 9 Drawing Sheets

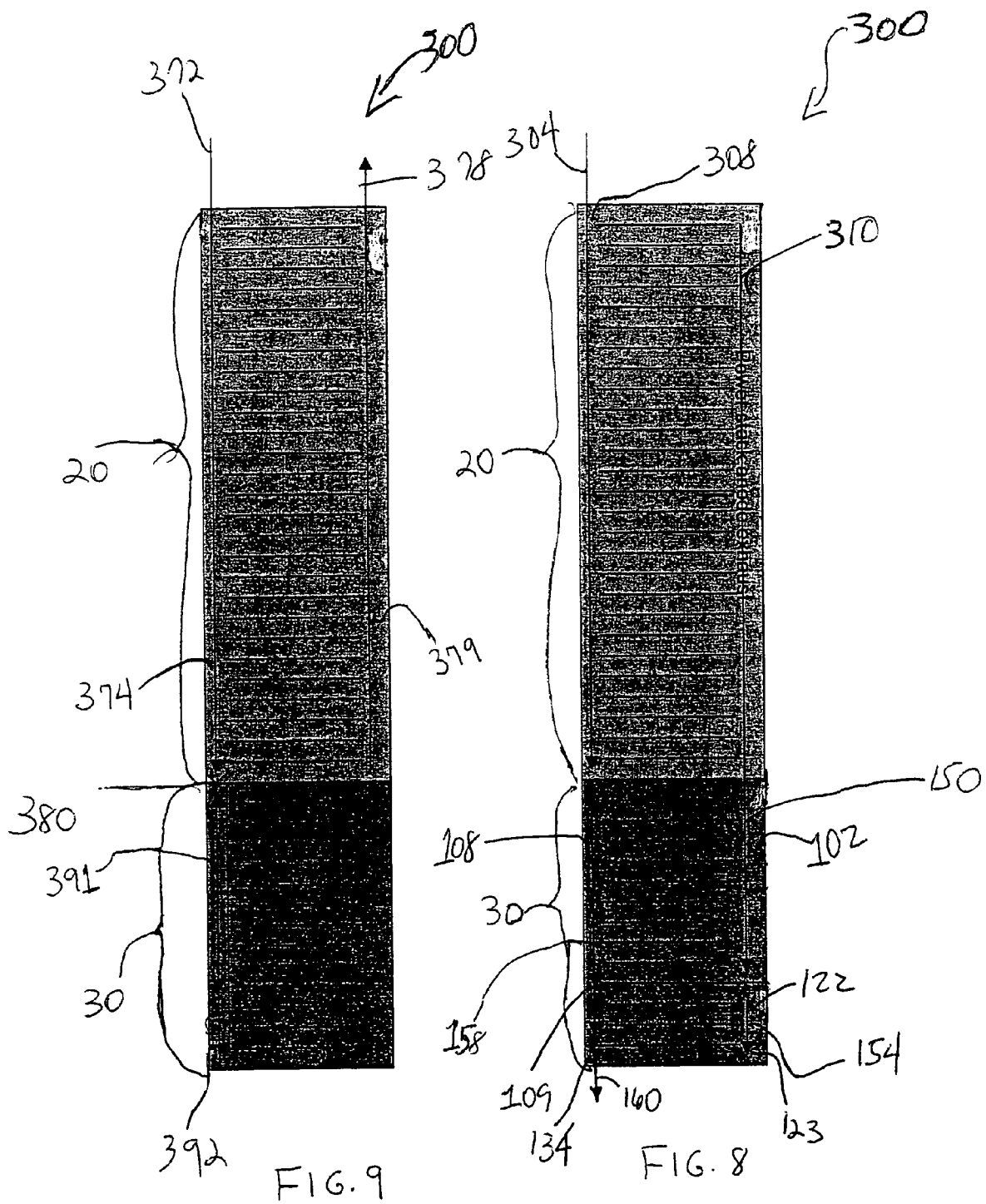

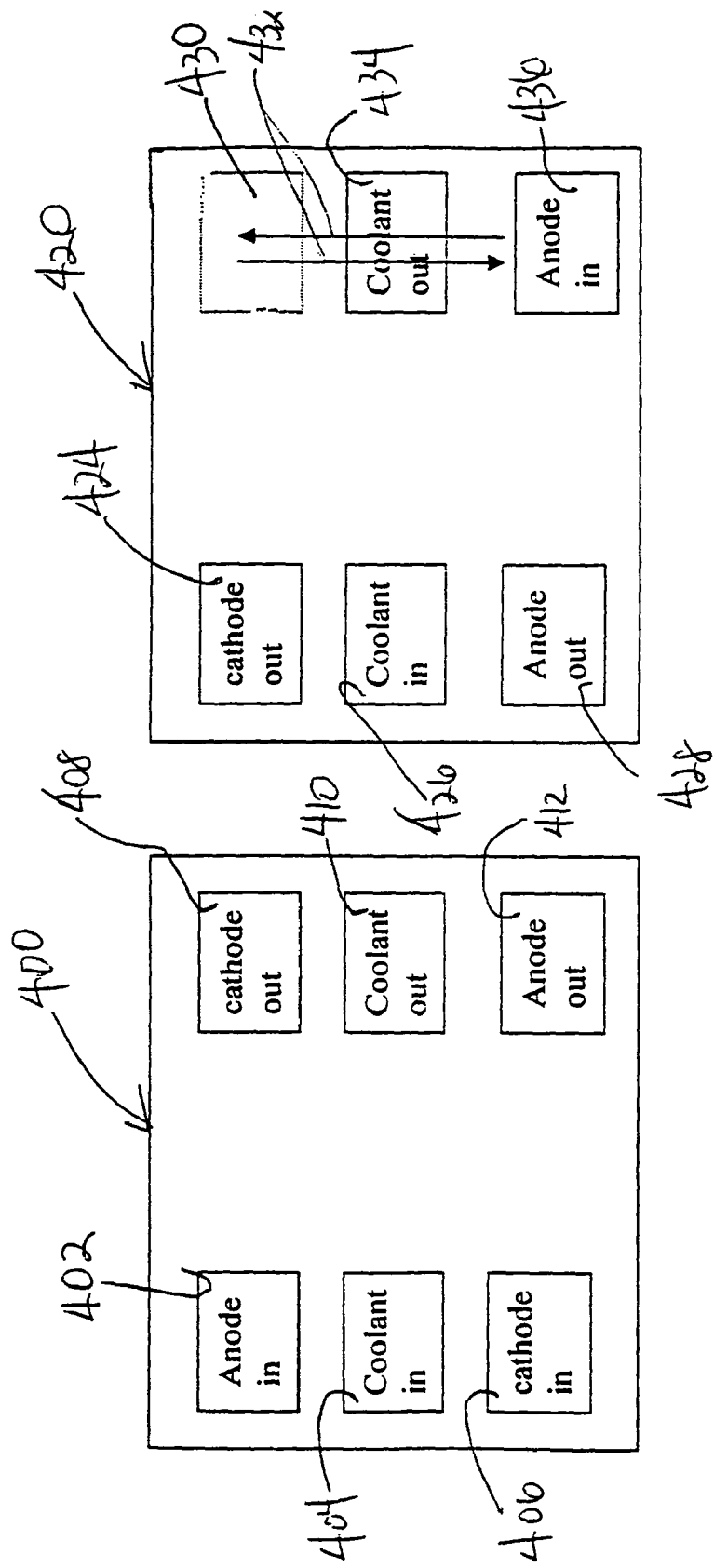

HIGH EFFICIENCY FUEL CELL SYSTEM

CROSS-REFERENCE TO RELATED APPLICATIONS

This application is related to U.S. patent application Ser. No. 11/295,704, entitled, "HIGH EFFICIENCY FUEL CELL SYSTEM," which is filed concurrently herewith.

BACKGROUND

The invention generally relates to a high efficiency fuel cell system.

A fuel cell is an electrochemical device that converts chemical energy directly into electrical energy. For example, one type of fuel cell includes a proton exchange membrane (PEM), that permits only protons to pass between an anode and a cathode of the fuel cell. Typically PEM fuel cells employ sulfonic-acid-based ionomers, such as Nafion, and operate in the 60° Celsius (C) to 70° temperature range. Another type employs a phosphoric-acid-based polybenziamidazole, PBI, membrane that operates in the 150° to 200° temperature range. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

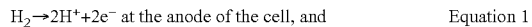

$H_2 \rightarrow 2H^+ + 2e^-$ at the anode of the cell, and  Equation 1

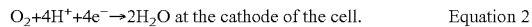

$O_2 + 4H^+ + 4e^- \rightarrow 2H_2O$ at the cathode of the cell.  Equation 2

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

The fuel cell stack is one out of many components of a typical fuel cell system, as the fuel cell system includes various other components and subsystems, such as a cooling subsystem, a cell voltage monitoring subsystem, a control subsystem, a power conditioning subsystem, etc. The particular design of each of these subsystems is a function of the application that the fuel cell system serves.

Irrespective of external humidification, with any PEM fuel cell stack there are two challenges with regard to the flow of gas inside the fuel cell stack: 1.) inert gas buildup; and 2.) water buildup. In the case of a pure hydrogen-fueled stack, over time, nitrogen and other inert gases diffuse from the cathode (air) side of the membrane to the anode (fuel) side of the fuel cell membranes. If the inert gases are not removed from the anode side of the membranes, then operation of one or more cells or the entire stack is eventually interrupted. In the case of all PEM stacks, water may build-up in the anode and/or cathode flow channels of the stack and over time, thereby causing instability of the cell or stack of cells. This condition is called flooding. In order to prevent the flooding condition, sufficient anode and cathode gas velocity must be provided to clear the water from the flow channels.

Thus, there exists a continuing need for a fuel cell system that prevents significant buildup of water and inert gases in a fuel cell stack of the system.

SUMMARY

In an embodiment of the invention, a technique includes operating a fuel cell, which produces an effluent flow. The technique includes routing the effluent flow through an electrochemical pump to extract fuel from the effluent flow and providing the extracted fuel to the fuel cell.

Advantages and other features of the invention will become apparent from the following drawing, description and claims.

BRIEF DESCRIPTION OF THE DRAWING

FIG. 8 is a schematic diagram of a combined power and hydrogen pump fuel cell stack illustrating anode flows of the stack according to an embodiment of the invention.

FIG. 9 is a schematic diagram of the combined power and hydrogen pump fuel cell stack illustrating cathode flows of the stack according to an embodiment of the invention.

FIG. 10 is a top view of an exemplary flow field plate of the power stack portion of the combined power and hydrogen pump fuel cell stack according to an embodiment of the invention.

FIG. 11 is a top view of an exemplary flow field plate of the hydrogen pump portion of the combined power and hydrogen pump fuel cell stack according to an embodiment of the invention.

DETAILED DESCRIPTION

Figure 1:
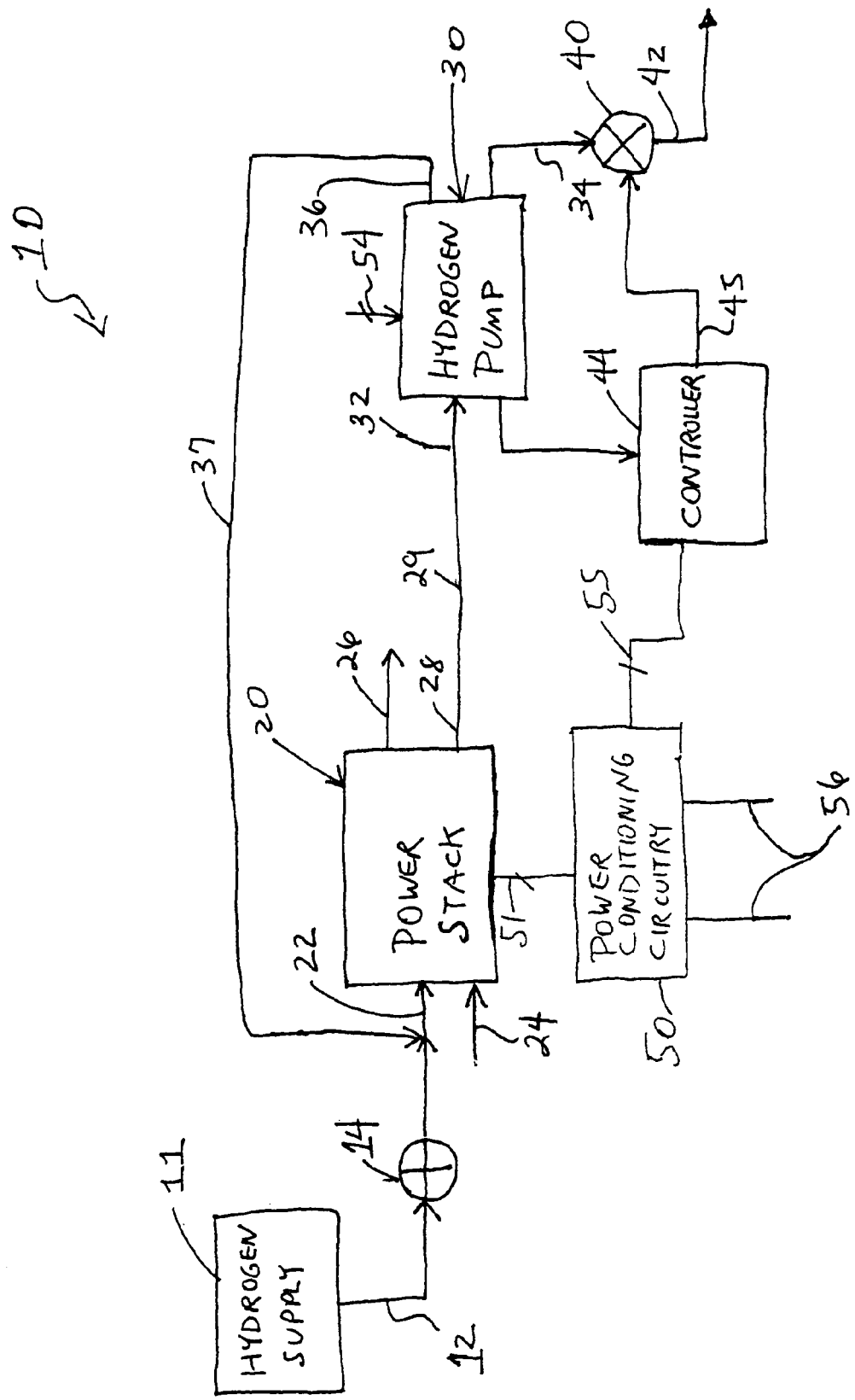
FIG. 1 is a schematic diagram of a fuel cell system according to an embodiment of the invention.

Referring to FIG. 1, a fuel cell system 10 in accordance with embodiments of the invention includes a fuel cell stack (herein called a "power stack 20") that produces electrical power for a load (not shown) in response to fuel and oxidant flows that are received by the power stack 20 at an anode intake inlet 22 and an oxidant intake inlet 24, respectively. The fuel cell system 10 may include power conditioning circuitry 50 that is coupled to stack terminals 51 to convert the DC voltage of the power stack 20 into a regulated, lower DC voltage or to a regulated AC voltage, depending on the particular embodiment of the invention. Thus, the power conditioning circuitry 50 has output terminals 56 that provide the regulated DC or AC voltage to the load.

For purposes of ensuring that cells of the power stack 20 are not "starved" of fuel, the incoming fuel flow to the stack 20 exceeds the stoichiometric ratio that is set forth in Equations 1 and 2 above. Therefore, an anode exhaust flow (exiting the power stack 20 at an anode exhaust outlet 28) of the power stack 20 contains residual fuel. For purposes of recovering this residual fuel to improve the overall efficiency of the fuel cell system 10, the system 10 includes an electrochemical hydrogen pump 30. The hydrogen pump 30 1.) purifies the anode exhaust from the power stack 20 to produce a fuel feedback flow that is routed back to the anode intake inlet 22 of the stack 20; and 2.) establishes a fuel flow rate through the stack 20, which is sufficient to keep the anode flow field channels of the stack 20 free of water blockages.

For purposes of simplifying the description herein, it is assumed that the power stack 20 and hydrogen pump 30 use polymer electrolyte membranes (PEMs). However, other embodiments of the invention are within the scope of the appended claims. For example, other types of fuel cell technologies other than PEM fuel cells are envisioned in other embodiments of the invention. Additionally, although an electrochemical hydrogen pump is described herein, it is understood that other types of electrochemical pumps may be used, in other embodiments of the invention.

In accordance with some embodiments of the invention, the hydrogen pump 30 is formed from a fuel cell stack that produces a relatively pure hydrogen flow at a cathode exhaust outlet 36 (of the pump 30) in response to the anode exhaust flow (received at an anode intake inlet 32 of the hydrogen pump 30) from the power stack 20 and received electrical power. In general, the hydrogen pump 30 may have the same overall topology of the power stack 30, in that the hydrogen pump 30 contains PEMS, gas diffusion layers and flow plates that establish plenums and flow fields for communicating reactants to fuel cells of the hydrogen pump 30. Furthermore, the hydrogen pump 30 may contain flow plates that route coolant through the pump 30. However, unlike the power stack 20, each fuel cell of the hydrogen pump 30 receives an electrical current (and serves as a load), and in response to the received current, hydrogen migrates from the anode chamber of the fuel cell to the cathode chamber of the fuel cell to produce hydrogen gas in the cathode chamber.

As described below, the fuel cell stack that forms the hydrogen pump 30 may be integrated with or separate from the power stack 20, depending on the particular embodiment of the invention. Furthermore, as further described below, the fuel cell stack that forms the hydrogen pump 30 may be electrically connected to or isolated from the power stack 20, depending on the particular embodiment of the invention. The hydrogen pump 30 is schematically depicted in FIG. 1 as receiving its electrical power from electrical lines 54. It is understood that the power to drive the cells of the hydrogen pump 30 may be furnished directly by a wide variety of different sources, such as the power stack 20 (for the case in which the cells of the stack 20 and the cells of the hydrogen pump 30 are part of the same stack), the power conditioning circuitry 50, etc.

Among the other components of the fuel cell system 10, the system 10 may include a hydrogen supply 11 (a hydrogen storage tank, for example) that has an outlet conduit 12, which is connected to a pressure regulator 14. The outlet of the pressure regulator 14 and the outlet of the hydrogen pump 30 are connected together to combine flows to produce the incoming fuel flow that is received ay the anode intake inlet 22 of the power stack 20. The power stack 20 also includes a cathode exhaust outlet 26, which may be connected to an oxidizer or a flare, in some embodiments of the invention. A controller 44 of the fuel cell system 10 may, for example, regulate the operation of the power conditioning circuitry 50, as well as control operation of a flow control valve 40 that regulates when effluent is purged from the hydrogen pump 30, as further described below.

The hydrogen pump 30 may be placed before or after the power stack 20 with respect to the direction that hydrogen is introduced into the system 10, depending on the particular embodiment of the invention. It may be advantageous to place the hydrogen pump 30 such that the pump 30 receives inlet hydrogen first, as this may alleviate issues with startup. In accordance with some embodiments of the invention, the hydrogen pump 30 is immediately filled with hydrogen on power-up of the fuel cell system 10 so that the pump 30 can begin pumping. Another way to get around the startup issue is to command a flow control valve or auxiliary purge solenoid to fully open to release hydrogen from a single cell cascade stage 76 (described below in connection with FIG. 2) while the cell is held at a constant, high voltage; and when the single cascade stage 76 cell sees hydrogen, its pumping voltage decreases, as the pump current simultaneously increases. At his point, the solenoid or flow control valve is commanded to close. It may also be advantageous to place the hydrogen pump 30 stack ahead of the power stack 20 for the purposes of scrubbing contaminants from a reformate flow. In such a configuration, waste hydrogen from the power stack, as well as fresh reformate enter the pump stack 20, and only pure hydrogen returns to the power stack 20. In this manner, the hydrogen pump 30 serves as both a purifier and a recirculator.

The use of an electrochemical hydrogen pump in an anode exhaust feedback loop of a power fuel cell stack may include one or more of the following advantages. Exhaust gas recirculation for water management may be accomplished without the disadvantage of nitrogen buildup. The hydrogen pump 30 provides in-situ filtration of the gases circulating in the anode loop. With mechanical recirculation of exhaust gas, if the feed-gas (hydrogen) is contaminated with a diluent or contaminating species, this gas can result in loss of power generation stack performance because the impurities are not directly removed. With the hydrogen pump 30, however, the diluent is constantly removed, resulting in a purified anode hydrogen loop. Additionally, the hydrogen pump 30 is a solid state device. This has several significant advantages over conventional exhaust gas recirculation methods, which include such devices as blowers and compressors. Because there are no moving parts, reliability is higher (i.e., an advantage over blowers and compressors). Hydrogen pumping is a more isothermal process than mechanical compression and therefore can achieve a higher efficiency, meaning lower power consumption for system auxiliaries. This can be particularly true at low loads where the hydrogen pump 30 may be efficiently turned down to a low flow with a near-linear response in pumping voltage (whereas a blower or compressor can continue to draw significant power). Because the hydrogen pump 30 has no moving parts, the issues associated with gas leakage at blower or compressor seals are eliminated. The hydrogen pump 30 preferentially selects hydrogen over nitrogen to re-circulate, which a mechanical system cannot do. When built as an integrated device with the power stack 20 (as further described below), this arrangement has lower costs due to the elimination of piping or hose connections.

Other and different advantages are possible in the various embodiments of the invention.

In accordance with some embodiments of the invention, a 1.2 hydrogen stoichiometric flow is provided to the power stack 20 to ensure that fuel cells of the stack 20 are not "starved" of hydrogen. This means that the hydrogen pump 30 circulates approximately a 0.2 hydrogen stoichiometric flow back to the anode intake inlet 22 of the power stack 20.

As a more specific example, in accordance with some embodiments of the invention, the power stack 20 and the hydrogen pump 30 are part of the same stack of bipolar flow plates. Thus, the same current flows through the cells of the power stack 20 and the cells of the hydrogen pump 30. Assume for purposes of this example that the power stack 20 has seventy cells, and the hydrogen pump 30 has fourteen cells. For a 0.2 hydrogen stoichiometric flow through the hydrogen pump 30 at a current density of 0.6 amperes per square centimeter (amps/cm$^2$), the individual cell voltage of the hydrogen pump 30 may be approximately 0.06 volt. Thus, the power requirement for the hydrogen pump 30 is approximately 132 watts (for 262 cm$^2$ active area). If the individual cells are controlled to operate at 0.6 amp/cm$^2$ at 0.09 volts by restricting the anode exhaust flow out of the hydrogen pump, the power requirement for the hydrogen pump 30 increases to approximately 198 watts.

Figure 2:
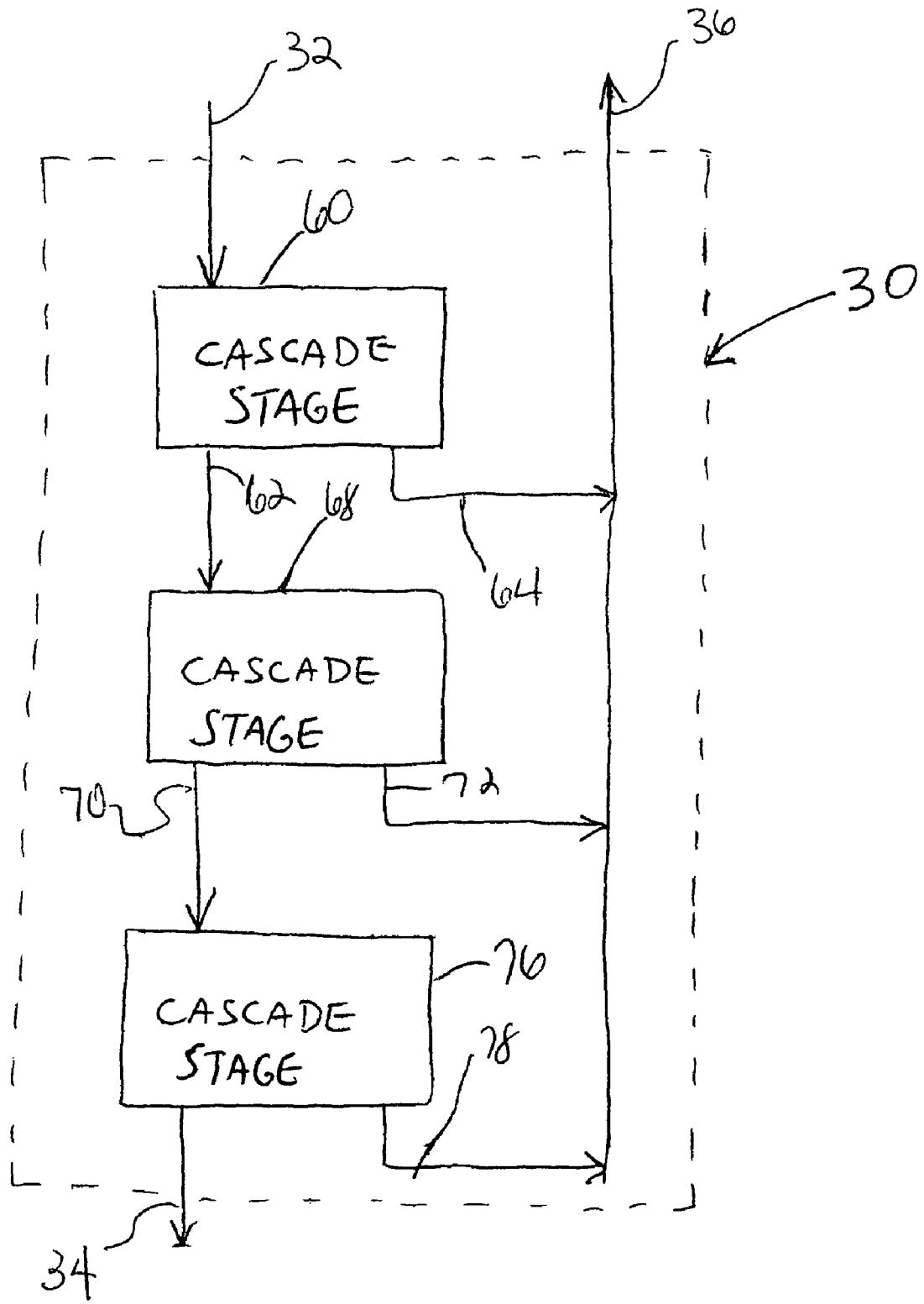
FIG. 2 is a schematic diagram of a hydrogen pump of FIG. 1 according to an embodiment of the invention.

Referring to FIG. 2, instead of the above-described approach in which serially-connected cells are used to implement the hydrogen pump, in accordance with some embodiments of the invention, the hydrogen pump 30 is formed from the interconnection of cascade stages 60, 68 and 76 that are electrically coupled together in series and also receive reactant flows in series, as described below. Each cascade stage 60, 68 and 76 functions as an electrochemical hydrogen pump. Thus, the cascade stage 60 produces a flow of hydrogen from the anode exhaust stream from the power stack 20, leaving a second anode exhaust stream; the cascade stage 68 produces a flow of hydrogen from the second anode exhaust stream, leaving a third anode exhaust stream; and the cascade stage 76 produces a flow of hydrogen from the third anode exhaust stream. The hydrogen flows from the cascade stages 60, 68 and 76 are combined and appear at the cathode exhaust outlet 36 of the hydrogen pump 30.

The cascade arrangement overcomes the cell-to-cell anode flow distribution problem that occurs with a parallel gas flow and series electrical current flow configuration. Referring now to the more specific details of the interconnections, in the cascade arrangement, the anode intake inlet 32 delivers the anode exhaust gas from the power stack 20 to the anode plenum of the stage 60. In response to the anode exhaust flow from the power stack 20, the cascade stage 60 creates a hydrogen gas flow in the cathode plenum of the cascade stage 60, and this flow is routed through a cathode exhaust outlet 64 of the cascade stage 60 to the cathode exhaust outlet 36 of the hydrogen pump 30. The anode exhaust from the cascade stage 60 passes through an anode exhaust outlet 62 to the anode plenum of the next cascade stage 68.

The cascade stage 68 recovers hydrogen from the incoming anode exhaust flow to form a hydrogen gas flow in the cathode plenum of the stage 68; and the hydrogen flow is routed through a cathode exhaust outlet 72 of the stage 68 to the cathode exhaust outlet 36 of the hydrogen pump 30. The anode exhaust from the cascade stage 68 passes through an anode exhaust outlet 70 of the stage 68 to the anode plenum of the last cascade stage 76.

The cascade stage 76 recovers hydrogen from the incoming anode exhaust flow to form a hydrogen gas flow in the cathode plenum of the stage 76; and the cascade stage 76 routes the hydrogen flow through a cathode exhaust outlet 78 of the stage 76 to the cathode exhaust outlet 36 of the hydrogen pump 30. The anode exhaust from the cascade stage 76 is routed to. the anode exhaust outlet 34 of the hydrogen pump 30.

Although FIG. 2 depicts three cascade stages, the hydrogen pump 30 may have fewer or more stages, depending on the particular embodiment of the invention. Furthermore, each cascade stage may have a different number of cells, in accordance with some embodiments of the invention. Neither the current density, nor the active area, need be identical between the cascade stages Although convenient to build the cascade stages as an integrated stack of flow plates, additional scrubbing of hydrogen from the anode exhaust flow may be accomplished by pumping the flow through a small single cell, perhaps one with a 50 cm$^2$ active area, in some embodiments of the invention.

As a more specific example, in accordance with some embodiments of the invention, the cascade stage 60 contains ten cells, the cascade stage 68 contains three fuel cells and the stage 76 contains one fuel cell. The first two stages 60 and 68 may have, for example, a hydrogen stoichiometric flow in excess of 1.2, and the flow of the single cell stage 76 is controlled by the flow control valve 40 (see FIG. 1). In this arrangement, all of the circulation flow of about 15.3 liters per minute passes through the anode chambers of the cascade 60. At 0.6 amp/cm$^2$ (about 157 amps for this example) the cascade stage 60 pumps about 10.9 liters per minute of hydrogen back to the anode intake inlet 22 (see FIG. 1) of the power stack 20. The individual cells of the cascade stage 68 have cell voltages of about 0.06 volt each for a total power input into the cascade stage 60 of about 94 watts.

For the cascade stage 68, an anode exhaust of about 4.5 liters per minute is directed to the anode chambers of the stage 68. At 0.6 amp/cm$^2$ (about 157 amps for this example) the stage 68 pumps about 3.3 liters per minute of hydrogen back to anode intake inlet 22 of the power stack 20. The individual cells of the cascade stage 68 have cell voltages of about 0.06 volt each for a power input of about 28 watts.

For the single cell, cascade stage 76, the anode exhaust (about 1.2 liters per minute) from the stage 68 is directed to the anode intake inlet of the stage 76. At a current density of 0.6 amp/cm$^2$ (about 157 amps for this example) the stage 76 pumps about 1.1 liters of hydrogen back to the fuel cell anode intake inlet 22. The cell of the stage 76 has a voltage of about 0.11 volts for a power input of about 17 watts. The voltage of this cell is regulated by the controller 44 (see FIG. 1) to be about 0.11 volt via the flow control valve 40. Thus, in response to the cell voltage decreasing below some threshold voltage near 0.11 volts, the controller 44 opens the flow control valve 40 to purge gas from the cell to raise the voltage back to 0.11 volts. This arrangement may be replaced by an appropriately-sized bleed orifice, in other embodiments of the invention. In this case, the bleed is on the order of about 0.1 liters per minute with a hydrogen content of approximately 1%, or 1 cm$^3$ per minute. In some embodiments of the invention, this bleed flow is routed back to the cathode intake inlet 24 of the power stack 20.

By using the above-described cascade arrangement, the anode flow distribution problem that occurs with a non-cascaded cell stack hydrogen pump is avoided, and the power that is needed to operate the hydrogen pump 30 is reduced from approximately 198 watts to approximately 139 watts (for the example described above).

Figure 3:
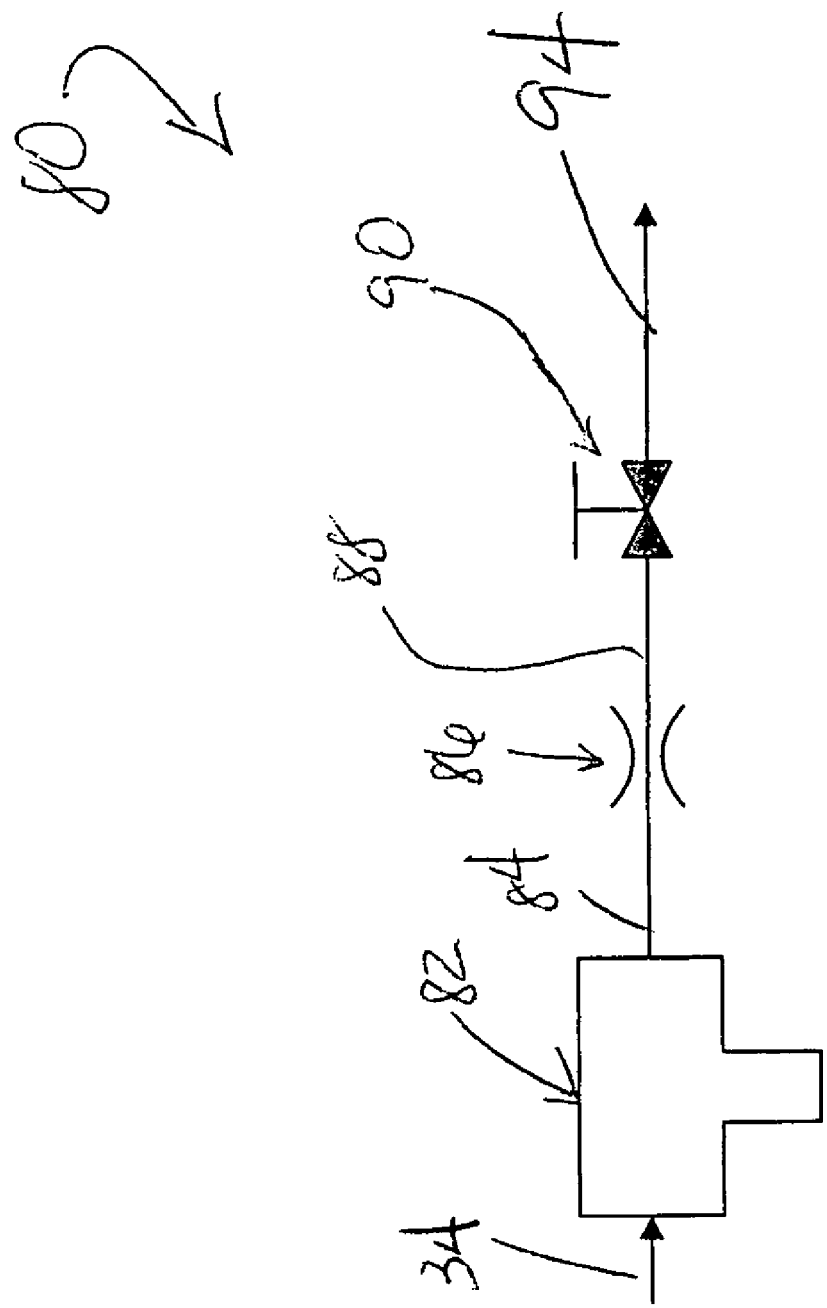
FIG. 3 is a schematic diagram of an anode exhaust subsystem for the hydrogen pump according to an embodiment of the invention.

Referring to FIG. 3, in accordance with some embodiments of the invention, a subsystem 80 may be alternatively used to vent exhaust from the cascade stage 76. Thus, the subsystem may be connected to the exhaust outlet 34 of the hydrogen pump 30 in place of the flow control valve 40 (see FIG. 1). The subsystem 80 includes a water trap 82 that is connected to the exhaust outlet 34 to remove water from the exhaust. An outlet 84 of the water trap 82 is connected to a flow restricting orifice 86, and an outlet 88 of the orifice 86 is connected to a purge solenoid valve 90, which may be controlled by the controller 44 (see FIG. 1). An outlet 94 of the solenoid valve 90 is in communication with the ambient environment, in some embodiments of the invention.

In operation, the solenoid valve 90 is opened in response to a voltage of the fuel cell of the cascade stage 76 dropping below a predetermined threshold voltage. Otherwise, the solenoid valve 90 remains closed. In other embodiments of the invention, the solenoid valve 90 may transition between open and closed states at a certain duty cycle, and in some embodiments of the invention, the duty cycle may be controlled to regulate the voltage of the cell. Thus, many embodiments are possible and are within the scope of the appended claims.

Figure 4:
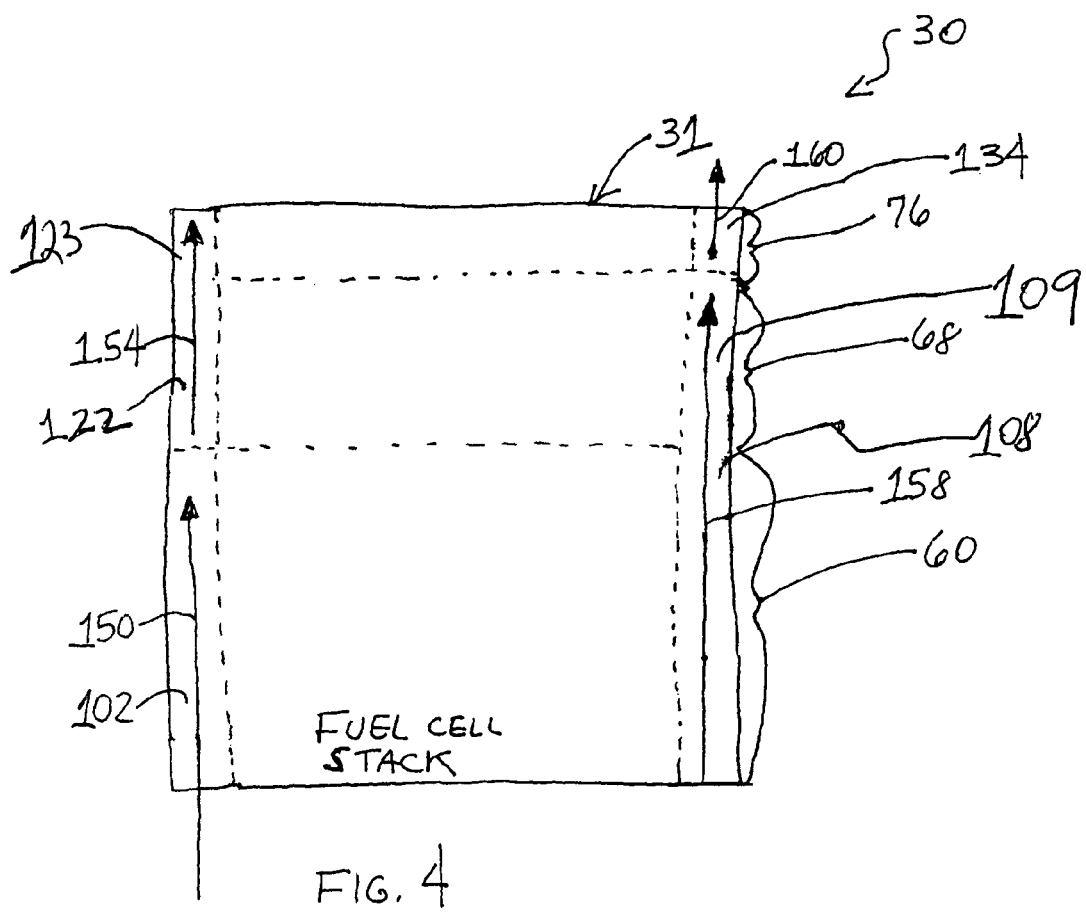
FIG. 4 is a schematic diagram of a fuel cell stack of the hydrogen pump illustrating anode flows through the stack according to an embodiment of the invention.

Referring to FIG. 4, the cascade stages 60, 68 and 76 may be formed in the same fuel cell stack 31 in accordance with some embodiments of the invention. FIG. 4 depicts the internal anode flow paths inside the stack 31. For the cascade stage 60, the flow plates have openings that align to collectively form a plenum 102 to communicate an incoming fuel flow 150 (i.e., the anode exhaust flow from the power stack 20) to the cells of the cascade 60. The flow field plates of the cascade stage 60 also have openings that align to form a plenum 108 to communicate an anode exhaust flow 158 from the cascade stage 60.

The anode exhaust plenum 108 is aligned with an anode intake plenum 109 of the cascade stage 68. Thus, the anode exhaust flow 158 from the cascade 60 serves as the incoming anode flow for the cascade stage 68. The flow 158 is communicated through the anode flow fields of the cascade stage 68, and the cascade stage 68 includes an anode exhaust plenum 122 that communicates a resulting anode exhaust flow 154 from the cascade 68.

The anode exhaust plenum 154 is aligned with an anode intake plenum 123 of the cascade stage 76. Thus, the anode exhaust flow 154 from the cascade 68 serves as the incoming anode flow for the cascade stage 76. The flow 154 is communicated through the anode flow fields of the cascade stage 76, and the cascade stage 76 includes an anode exhaust plenum 134 that communicates a resulting anode exhaust flow 160 from the cascade 76 and to anode exhaust outlet 34 (see FIG. 1) of the hydrogen pump 30.

The use of the cascade arrangement may cause water to build up in the anode exhaust plenums in the middle cascade stages, such as the cascade stage 68. Thus, water may collect in the plenum 122 and may possible cause instability in the cells of the cascade stages, which, in turn, may disrupt operation of the cascade stage 68. One way to manage the water buildup is to make the flow plates of the cascade stage 68 relatively thick, as compared to the other flow plates of the hydrogen pump 30. A relatively large plate thickness allows larger cross-sectional areas for the anode flow channels of the cascade stage 68, thereby increasing the ability to accommodate water.

Figure 5:
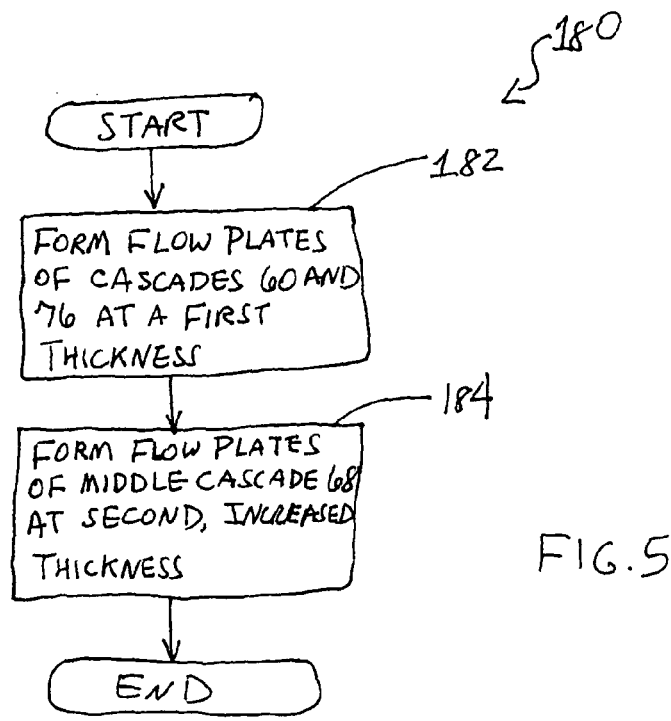
FIG. 5 is a flow diagram depicting a technique to manage water inside a cascade of the hydrogen pump according to an embodiment of the invention.

Referring to FIG. 5, therefore, in general a technique 180 to manage water in the hydrogen pump 30 includes forming (block 182) flow plates of the cascade stage 60 and 76 at a first thickness and forming (block 184) flow plates of the middle cascade stage 68 at a second, increased thickness.

Alternatively or in combination with the thicker flow plates, a membrane that wicks away liquid water but separates gas streams, might be used to transport liquid water that builds up in upper cascades down to lower cascades for removal. For example, a Supor™ brand membrane might be used for this application. However, other membranes may be used, in other embodiments of the invention.

Figure 6:
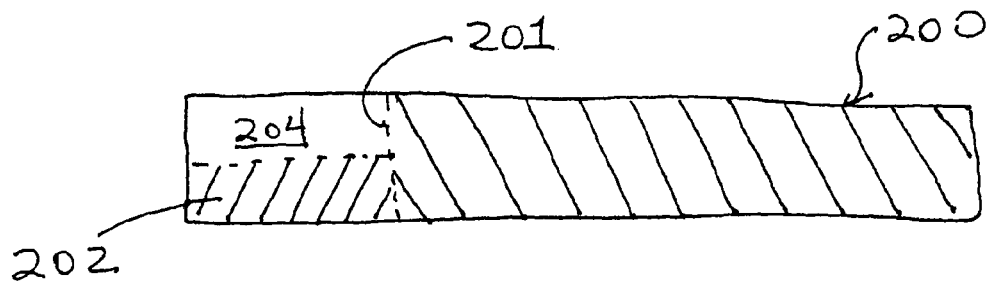
FIG. 6 is an illustration of a flow plate of the hydrogen pump according to an embodiment of the invention.

Referring to FIG. 6, in accordance with some embodiments of the invention, a cascade separator plate 200 may be used between the cascade stages 60 and 68 for purposes of water management. The cascade separator plate 200 includes an opening 201 that is aligned with the anode exhaust plenum 122 (see FIG. 4) of the cascade 68 and the anode intake plenum 102 of the cascade 60. A membrane 202 that separates the anode plenums 102 and 122 resides in the opening 201 but separates the gas streams in the plenums 102 and 122. The membrane 202 serves as a wick to collect water from the anode exhaust plenum 122 and route the water to the anode intake plenum 102. As depicted in FIG. 6, a recessed region 204 may exist above the membrane 202 for purposes of creating a local region of low flow velocity to facilitate knock-out of water droplets.

Other variations may be used to collect water from the cascade stage 68 in other embodiments of the invention. For example, in other embodiments of the invention, a float valve or a U-trap may be used to collect water from the anode exhaust plenum 120. As another example, a water leveling-sensing solenoid valve may be used to remove from the cascade stage 68.

Measures may also be used to prevent the generation of water in the cascade stage 68. More specifically, in accordance with some embodiments of the invention, precise thermal regulation may be used to prevent the accumulation of water in the hydrogen pump 30. Although the hydrogen pump 30 technically generates heat because it is an electrical load, the stack that forms the pump 30 radiates more than enough heat to the surrounding environment to keep itself cool. Thus, the "coolant" flow to the hydrogen pump 30 actually serves to put heat into the stack, as the stack radiates more than enough heat to the surrounding environment to keep itself cool. Therefore, in accordance with some embodiments of the invention, thermal energy is applied to the hydrogen pump 30 to raise the pump's operating temperature to the dewpoint of hydrogen to minimize if not prevent the condensation of water.

Figure 7:
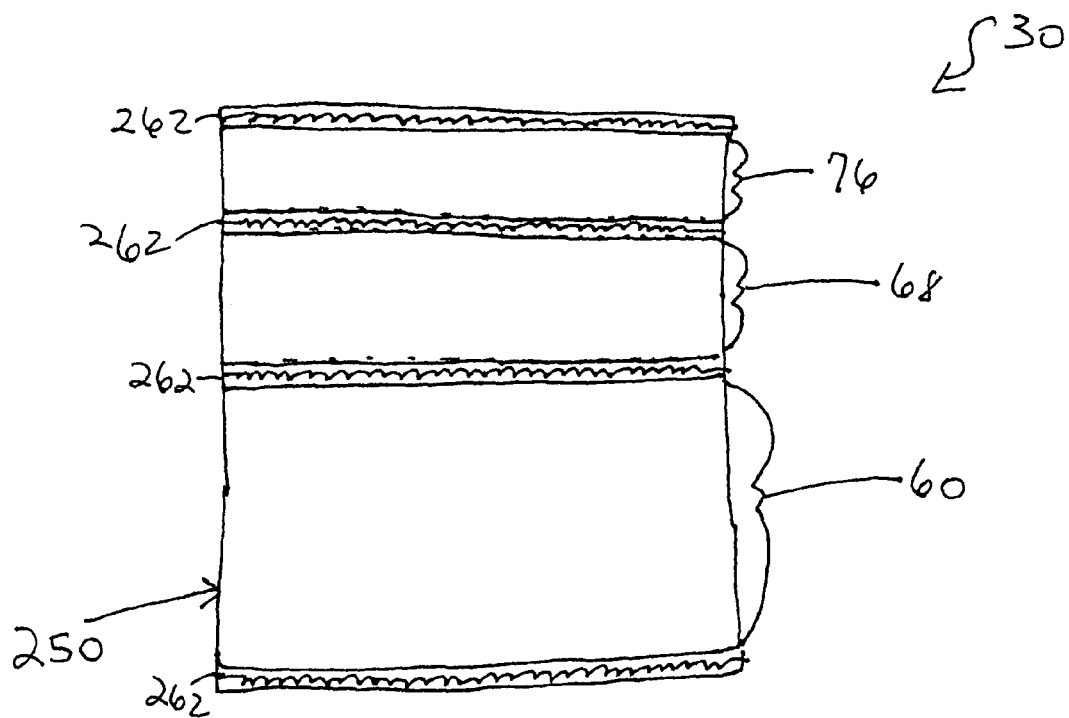
FIG. 7 is a schematic diagram of a fuel cell stack of the hydrogen pump and thermal heating features of the stack according to an embodiment of the invention.

Referring to FIG. 7, to accomplish this, heater pads 262 may distributed through a stack 250 in which the hydrogen pump 30 is formed. As depicted in FIG. 7, in some embodiments of the invention, the heater pads 262 are located at the cascade stage boundaries. However, in other embodiments of the invention, the heater pads 262 may be located between every cell of the stack are at a set cell spacing (every fourth cell, for example) throughout the stack. Thus, many variations are possible and are within the scope of the appended claims.

The hydrogen pump 30 may be heated in a number of different ways including but not limited to, the pad heaters that are located between, such as the pad heaters 262; pad heaters that surround the stack 250; and pad heater that heat the entire enclosure. Pad heaters may also be placed between cells as un-insulated resistive heaters, and the stack may be heated using current that passes through the resistive heaters. Passive heating may also be accomplished, for example, by using waste heat from the power stack 20. Additionally, all of the exit coolant from the power stack 20, at perhaps 5° C. higher than the inlet, may be fed to the stack of the hydrogen pump 30, thereby raising the pump stack's operating temperature nearer to dewpoint of its inlet hydrogen stream.

In accordance with some embodiments of the invention, the hydrogen pump 30 and the power stack 20 may be integrated together in the same stack. Thus, although FIG. 1 depicts explicit conduits 29 and 37 communicating exhaust and fuel input flows between the power stack 20 and the hydrogen pump 30, these "conduits" may be internal plenums of the same stack in accordance with some embodiments of the invention.

As a more specific example, FIG. 8 depicts internal anode flow paths of a stack 300 that forms the power stack 20 and the hydrogen pump 30 in accordance with some embodiments of the invention. Referring to FIG. 8 in conjunction with FIG. 4, the anode intake plenum 102 of the cascade stage 60 is aligned with and is in fluid communication with an anode exhaust plenum 310 of the power stack 20. An incoming anode flow 304 enters an anode intake plenum 308 of the power stack 20, and the portion of the flow that is not consumed by electrochemical reactions forms the anode exhaust flow 150 that is processed by the hydrogen pump 30.

FIG. 9 depicts internal cathode flow paths of the stack 300 in accordance with an embodiment of the invention. As shown, the power stack 20 includes a cathode intake plenum 374 that receives an oxidant intake flow 372. The oxidant intake flow 372 is routed through the oxidant flow channels of the power stack 20 to produce an oxidant exhaust flow 378 in the cathode exhaust plenum 379. A bleed flow from the anode exhaust of the hydrogen pump 30 is routed via an orifice 380 into the cathode intake plenum 374. Alternatively, a bleed flow is routed from the anode exhaust of the hydrogen pump 30 to the cathode exhaust plenum 379.

FIGS. 10 and 11 depict top views of exemplary flow plates 400 and 420 of the power stack 20 and hydrogen pump 30, respectively, in accordance with some embodiments of the invention. Referring to FIG. 10, anode inlet 402 and anode outlet 412 plenum openings in the flow plate 400 are diagonally opposed to each other. Additionally, cathode inlet 406 and cathode outlet 408 plenum openings in the flow plate 400 are also diagonally opposed to each other; and the flow plate 400 includes a coolant inlet opening 404 and a coolant outlet opening 410. Referring to both FIGS. 10 and 11, the anode inlet 402 of the flow plate 400 aligns with a cathode outlet 424 of the flow plate 420; the cathode inlet 406 of the flow plate 400 aligns with an anode outlet 428 of the flow plate 420; and the anode outlet 412 of the flow plate 400 aligns with an anode inlet 436 of the flow plate 420. The hydrogen pump 30 in these embodiments of the invention has no plumbing connection directly above the cathode outlet 408 of the power stack 20, so this plenum serves as an intermediary exchange port for transfers between cascades.

Figure 12:
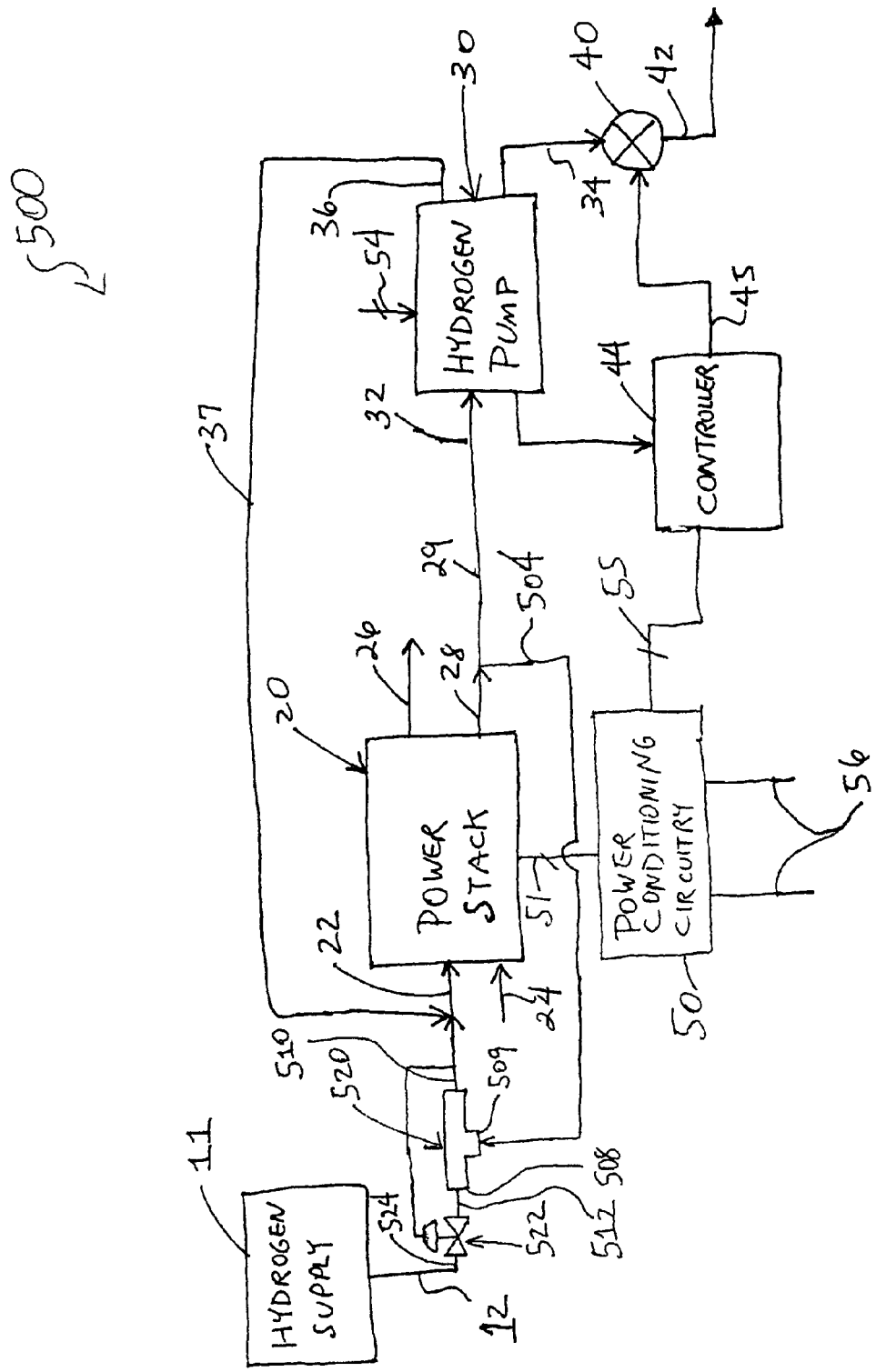
FIG. 12 is a schematic diagram of a fuel cell system according to another embodiment of the invention.

Referring to FIG. 12, in accordance with some embodiments of the invention, a fuel cell system 500 may be used in place of the fuel cell system 10 of FIG. 1. The fuel cell system 500 has common components with the fuel cell system 10 and is described with like reference numerals, with the differences being pointed out below.

Among these differences, the fuel cell system 500 includes an additional anode exhaust recirculation flow. In particular, the fuel cell system 500 uses a venturi 520 to establish another recirculation flow path between the anode exhaust outlet 28 of the power stack 20 and the anode intake inlet 22 of the stack 20. In this regard, an inlet 508 of the venturi 520 is coupled to receive an incoming fuel flow, such as a fuel flow provided by the hydrogen supply 11. An outlet 510 of the venturi 520 is connected to the anode intake inlet 22, and a flow path or conduit 504 couples the anode exhaust outlet 28 to a feed inlet 509 of the venturi 520. A pressure regulator 522 that remotely senses the pressure at the anode intake inlet 22 regulates the incoming fuel flow to the inlet 508.

Due to this arrangement, a relatively constant feedback flow is created through the flowpath or conduit 37 from the cathode exhaust outlet 36 of the hydrogen pump 37. This flow may be generally represented by a waveform 602 in FIG. 13, a waveform that depicts the hydrogen pump flow versus system power or "motive" flow, meaning the flow of fresh hydrogen fuel to the power stack 20. Referring to FIG. 12 in conjunction with FIG. 13, during the initial startup of the fuel cell system 500 when the system power is low, the feedback flow through the venturi 520 generally establishes the overall recirculation of anode exhaust back to the anode intake inlet 22 of the power stack 20, as depicted by waveform 600, which is the total recirculated anode exhaust that is fed back to the inlet 22.

Figure 13:
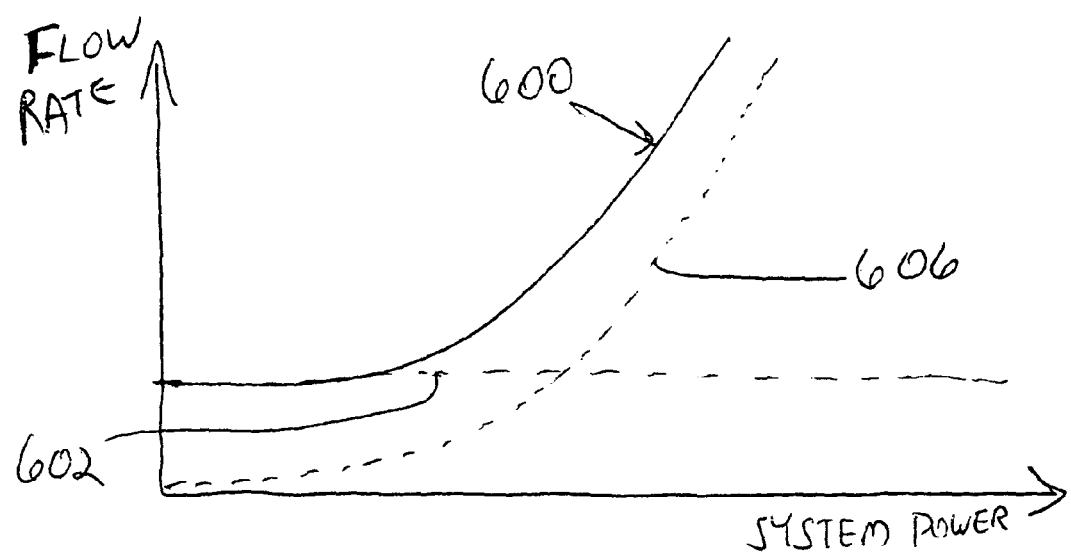
FIG. 13 depicts waveforms of anode feedback flows of the fuel cell system of FIG. 12 according to an embodiment of the invention.

As can be seen from FIG. 13, during the initial startup of the fuel cell system 500, the flow from the hydrogen pump 30 is relatively low (as compared to the feedback through the venturi 520). However, after the initial startup phase of the fuel cell system 500, the feedback flow from the hydrogen pump 30 dominates to significantly improve the overall efficiency of the fuel cell system 500.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   operating a first fuel cell, the operation of the first fuel cell producing a first effluent flow;
   routing the first effluent flow through an electrochemical pump to extract fuel from the first effluent flow;
   providing the extracted fuel to the first fuel cell; and
   wherein routing the first effluent flow through the electrochemical pump comprises:
   providing the first effluent flow to a second anode chamber of a second fuel cell in a first stage of a plurality of cascaded stages and applying power to the second fuel cell to cause the second fuel cell to produce hydrogen in a second cathode chamber of the second fuel cell in response to the first effluent flow;
   providing a second effluent flow from the second fuel cell to a third anode chamber of a third fuel cell in a second stage of the plurality of cascaded stages and applying power to the third fuel cell to cause the third fuel cell to produce hydrogen in a third cathode chamber of the third fuel cell in response to the second effluent flow.

2. The method of claim 1, wherein the second anode chamber is directly connected to the third anode chamber to conduct the second effluent flow.

3. The method of claim 1, further comprising:
   providing a material to serve as a wick to collect water from one of the cascaded stages and route the water to another one of the cascaded stages.

4. The method of claim 3, further comprising:

placing the material in a recessed region formed inside said one of the cascaded stages.

5. The method of claim 1, further comprising:

providing a mechanism inside one of the cascaded stages to remove water from said one of the cascaded stages.

6. The method of claim 5, wherein the mechanism comprises one of a U-trap, a float valve and a solenoid valve.

7. The method of claim 1, further comprising:

regulating communication of exhaust from an anode chamber of one of the stages.

8. The method of claim 7, wherein the act of regulating comprises selectively opening and closing communication with the anode chamber based on a fuel cell voltage.

9. The method of claim 1, further comprising:

applying heat to the hydrogen pump to reduce water production inside the pump.

10. The method of claim 1, further comprising:

combining the hydrogen produced in the second cathode chamber of the second fuel cell and the hydrogen produced in the third cathode chamber of the third fuel cell; and providing the combined hydrogen to the first fuel cell.

* * * * *